June 29, 1965
G. S. FENN
3,191,835
TRANSPORT APPARATUS
Filed Jan. 11, 1963
3 Sheets-Sheet 1
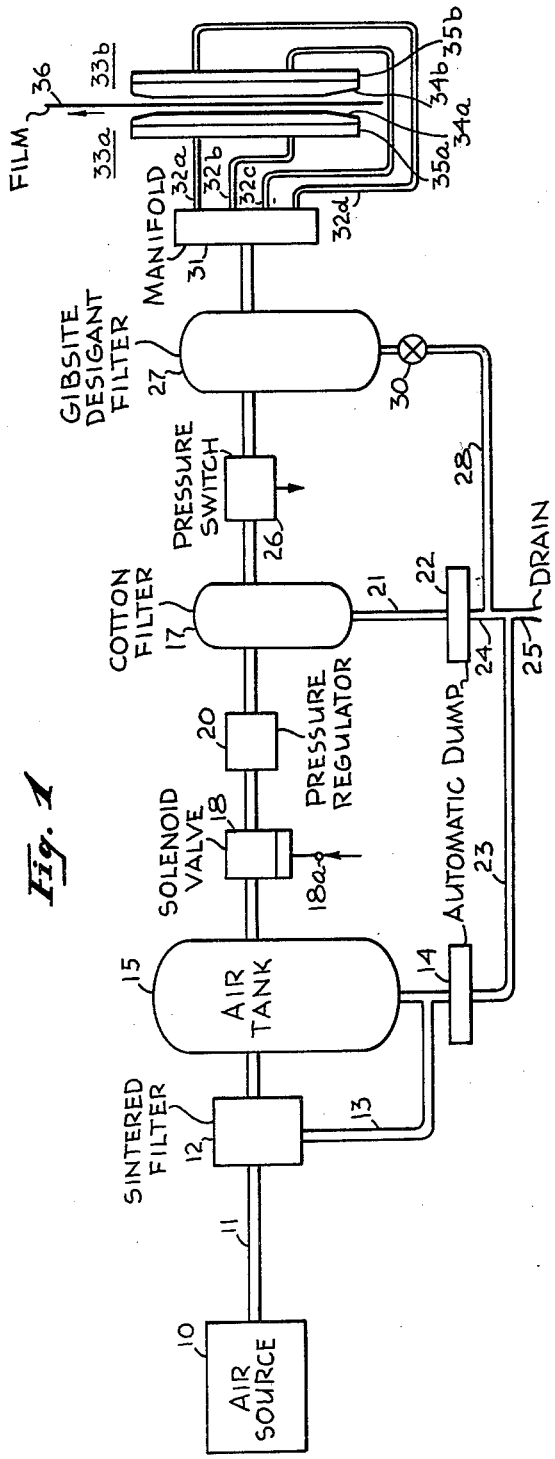
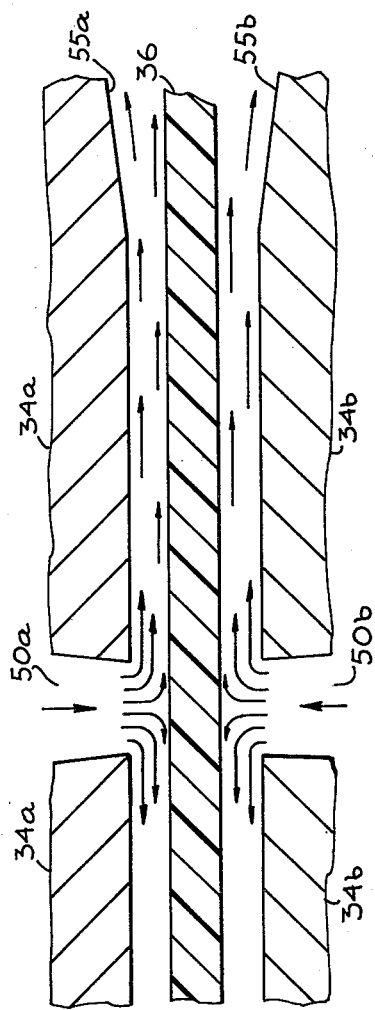
GEORGE S. FENN
INVENTOR.
BY Allen E. Botney
ATTORNEY June 29, 1965  G. S. FENN  3,191,835
TRANSPORT APPARATUS
Filed Jan. 11, 1963  3 Sheets-Sheet 2
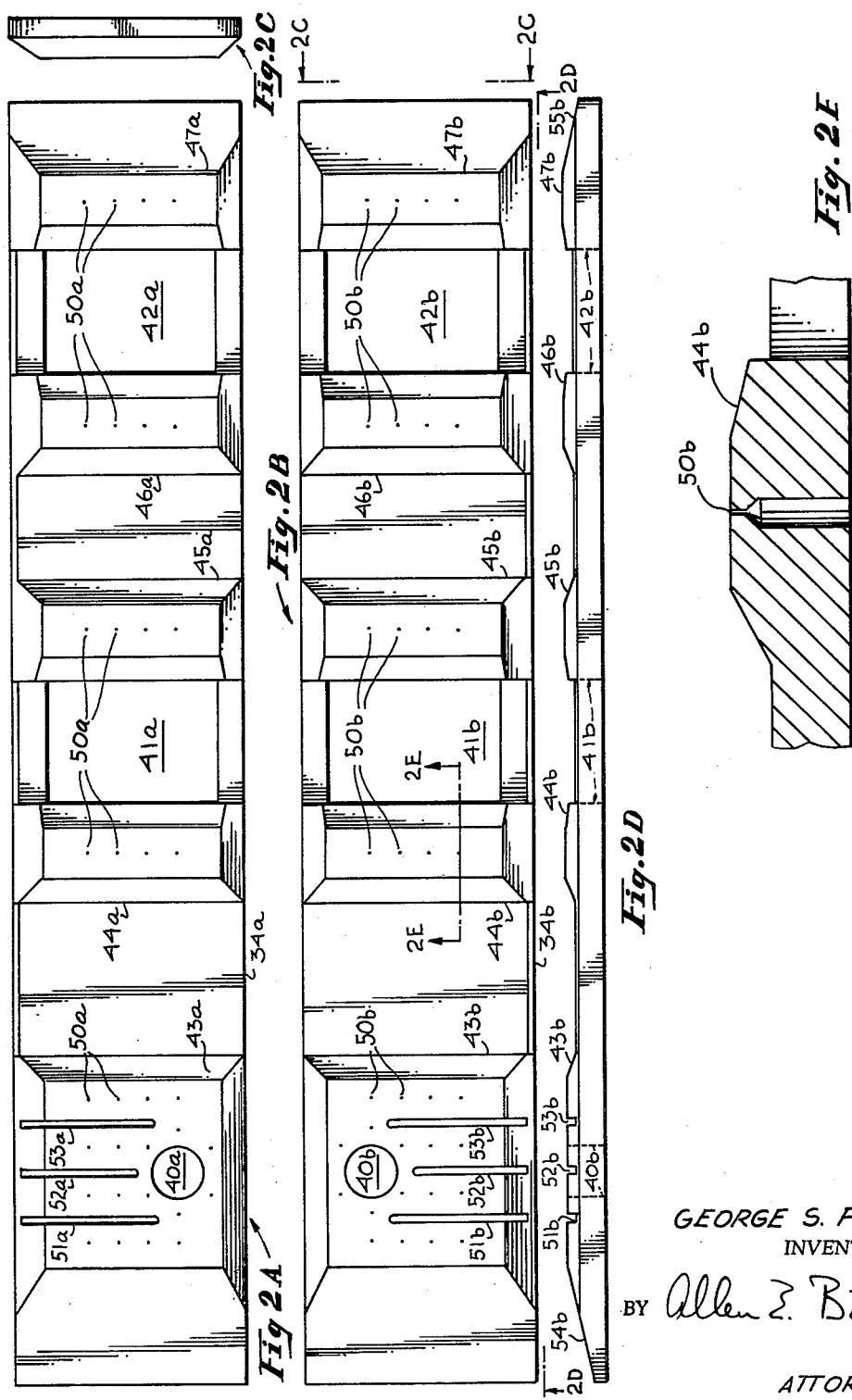
GEORGE S. FENN
INVENTOR.
BY Allen E. Botney
ATTORNEY June 29, 1965   G. S. FENN   3,191,835
TRANSPORT APPARATUS
Filed Jan. 11, 1963   3 Sheets-Sheet 3
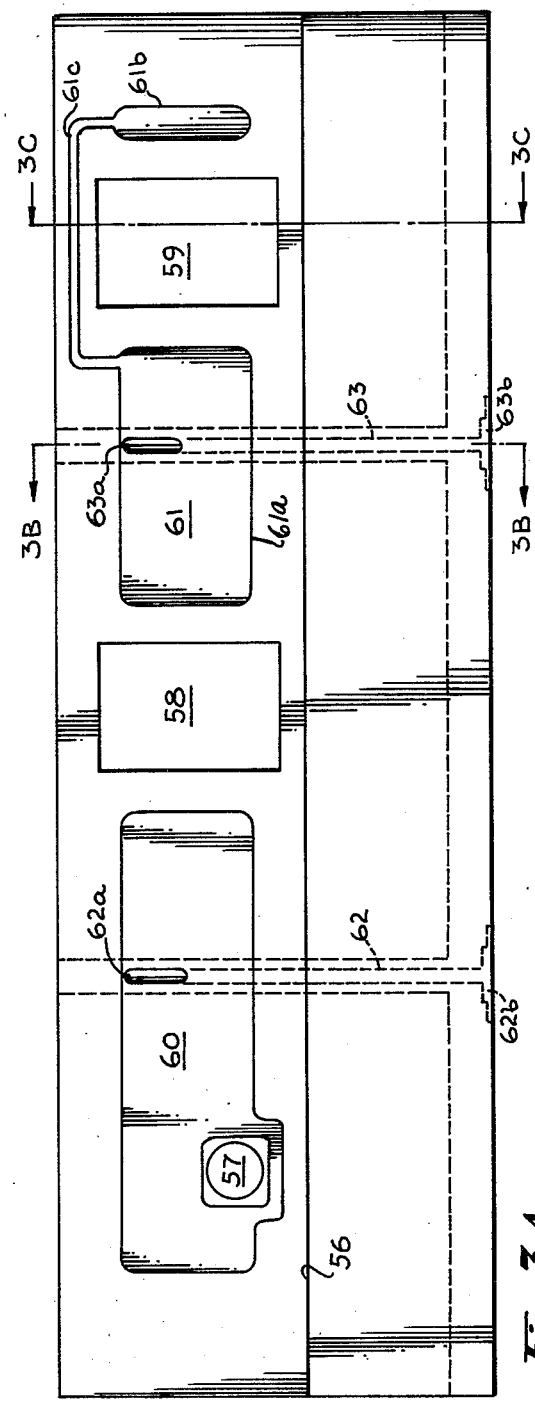
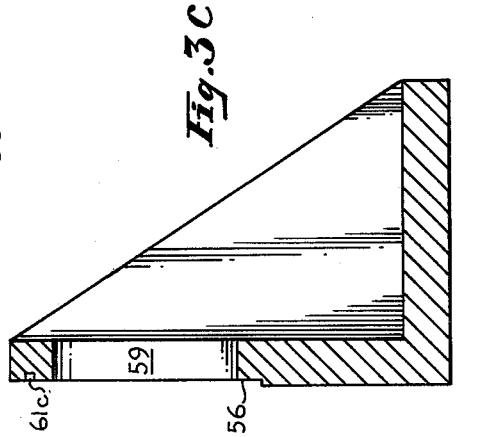
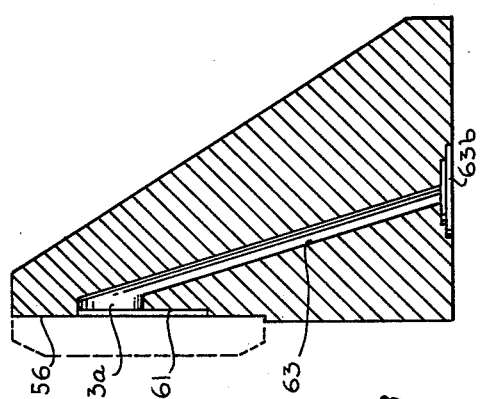
GEORGE S. FENN
INVENTOR.
BY *Allen E. Botney*
ATTORNEY United States Patent Office 3,191,835
Patented June 29, 1965

3,191,835
TRANSPORT APPARATUS
George S. Fenn, Rolling Hills, Calif., assignor to FMA, Inc., El Segundo, Calif., a corporation of California
Filed Jan. 11, 1963, Ser. No. 250,805
6 Claims. (Cl. 226—97)

The present invention relates in general to transport mechanisms for ribbon-type media such as film, magnetic tape, and the like, and more particularly relates to a new and novel transport mechanism of the kind mentioned by means of which cushions of air are provided for support of the media involved during the course of its motion.

It should be noted at the outset that the subject invention has general applicability in that it can be used with any ribbon-type media, such as photographic film, magnetic tape, plastic tape, paper tape, and the like. However, notwithstanding its broader or more general applicability, in order to more clearly set forth the novel aspects and features of the invention and, also, because it has proven to be particularly advantageous in its use with photographic film, the preferred embodiment of the invention to be described below is one adapted for use with this kind of media, namely, photographic film. However, in reading through the description that follows, it should at all times be kept in mind that with but slight modification, the preferred embodiment can be adapted for use with ribbon-type media of another kind, such as the magnetic tape, paper tape, and plastic tape mentioned above.

Thus, as is well known, reels of film are used for the projection of motion pictures as well as for information storage and retrieval purposes. In connection with its latter use, a document is recorded or stored on one portion of a film frame and alongside it, on another area of the same frame, is recorded indexing or identifying information that can be used later to retrieve the document. The indexing information is customarily recorded in binary-coded form and is scanned during the retrieval operation by means of a tiny spot of light, the output obtained as a result of the scanning process being compared with coded indexing information fed into the system. If the desired identity exists between the two groups of coded information, then the film is stopped and the frame on which the desired document is recorded is projected on a screen or otherwise reproduced.

One of the problems that has been encountered for a long time in connection with the use of film is that the emulsion on the film eventually becomes scratched, thereby reducing the clarity and legibility of the picture. This is due to the fact that the film is forced to rub against metal surfaces during a portion of its path, with the result that, in time, part of the emulsion is eroded away. Scratches and other imperfections caused in this manner are of particular concern in the matter of information storage and retrieval since if any portion of the coded indexing information is deteriorated or erased, then significant errors could be made in that the machine would fail to recognize the identity between the compared codes, thereby destroying the utility of such a system.

In connection with ribbon-type media other than film, the contact between the media and the metal holds similar disadvantages. Thus, should the media be a reel of paper that is moving at high speed, the paper may very well tear after being used for only a relatively short time. Again, with respect to magnetic tape, the magnetic coating, like the photographic emulsion, may become eroded by the constant scraping of the metal against it.

The present invention substantially overcomes the difficulties mentioned by preventing the film (or other media) from contacting metal surfaces during the significant portion of its travel path. In accordance with the basic concept of the invention this is accomplished by supporting the film with cushions of air. More specifically, the film is made to pass between a pair of plates, hereinafter referred to as "air gates," containing orifices through which air is forced against the two sides of the film. To ensure satisfactory film support, the same pressure distribution is provided on both sides of the film, which entails not only regulation of the air pressure within narrow limits but also strict adherance to experimentally determined design factors for the construction and spacing of the air gates. Furthermore, to prevent the erosion of the film and thereby extend its life, the air is filtered or cleansed several times before it is brought into contact with the film.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a block diagram or schematic presentation of film transport apparatus constructed in accordance with the present invention;

FIGURES 2(a)–2(e) present top, end, side and cross-sectional views of the film air gates, the elements through which air support for the film is provided;

FIGURES 3(a)–3(c) present top and cross-sectional views of the air gate support members, by means of which the air, under pressure, is supplied to air gates; and FIGURE 4 is a cross-sectional view, greatly enlarged, of a portion of the air gates and the film therebetween, orifices in the gates and the flow of air therefrom being specifically shown.

Referring now to the drawings and in particular to FIG. 1 therein, an air source 10 is shown coupled by means of an air supply line 11 to a first air filter 12, preferably a sintered filter. Air source 10 may be an air compressor which, as is well known, draws in air from the surrounding atmosphere and later ejects the air under pressure. In the present instance, the preferred pressure for the air coming out of the compressor is 150 p.s.i. As the air from the compressor passes through sintered filter 12, water, oil and dirt particles are extracted from it, the impurities mentioned thereafter settling via connecting pipe 13 in an automatic dump receptacle 14.

The air out of filter 12 is fed to an air tank 15 which holds or stores relatively large amounts of the air under the same pressure, namely, 150 p.s.i., the air tank in this way performing the function of a flywheel in that it dampens or takes out the pulsations produced by the compressor. Due to the lower temperatures existing in the air tank, condensation will occur, with the result that water and oil particles will ultimately drop to the bottom of the tank and thereafter become deposited, via connecting pipe 16, in dump receptacle 14. The air obtained from tank 15 is fed to a second air filter 17 which, this time, is preferably a cotton filter, a solenoid valve 18 and a pressure regulator 20 being interposed in the line between the two. Solenoid valves and pressure regulators of the type used herein are well known and commercially available so that a detailed description of them is not deemed necessary. Suffice it to say, therefore, that solenoid valve 18 is connected to external circuitry that will apply a signal at its input terminal 18a should the film tear or break and, in response to such a signal, the solenoid valve will shut off the flow of air in the line. Pressure regulator 20, on the other hand, reduces the pressure of the air from 150 p.s.i. to 40 p.s.i. gauge so that the air is at the lower of these pressures when it reaches filter 17. Due to the pressure drop at this point in the line, still more condensation occurs and the water thusly formed is taken out by cotton filter 17, the water, as well as oil and dirt particles, eventually finding their way through a pipe 21 to another automatic dump receptacle 22. The output ends of dump receptacles 14 and 22 are respectively connected by pipes 23 and 24 to a drain pipe 25, the impurities deposited in receptacles 14 and 22 being emitted from the system through these pipes.

Following cotton filter 17, the air passes through a pressure switch 26 to a final filter 27 which is preferably a five micron desiccant gibsite type of filter. This type of filter is preferred in the final filter stage because, as was already implied, it will only permit particles or impurities of less than five microns in diameter to pass through it. Accordingly, the air emerging out of filter 27 is quite clean. However, any impurities trapped by filter 27 are passed through a pipe 28 which ultimately connects to drain pipe 25 where these impurities are passed out of the system. A valve 30 is connected in the pipe 28 line to prevent any feedback of air through filter 27 should the air pressure in the main line of the system be drastically reduced for some reason. In this regard, pressure switch 26 is inserted as an additional safeguard for, in the event the pressure drops below a preset level that is insufficient to support the film, the pressure switch will generate a signal that will be applied directly to the transport portion of the system which, in response to this signal, will immediately shut down to prevent any damage to the film.

The pure air emerging from filter 27 enters a manifold 31 wherein the air is equally distributed to four pipes or hoses 32a–32d which intercouple the manifold with a pair of film support arrangements generally designated 33a and 33b. More specifically, arrangements 33a and 33b are each made up of two parts, namely, a film air gate and an air gate support member, the film air gate and its associated air gate support member in arrangement 33a respectively being designated 34a and 35a while the film air gate and air gate support member in arrangement 33b are respectively designated 34b and 35b. As shown in the figure, film air gates 34a and 34b face each other, the moving film, designated 36, passing midway through the space between them. As will be seen later, air gates 34a and 34b include a plurality of orifices through which air under pressure is forced against film 36, the cushions of air thusly formed on both sides of the film thereby providing the support for it as it moves along at high speed. Air gate supports 35a and 35b are respectively mounted on the backsides of film air gates 34a and 34b and, in addition to providing mechanical support for the film air gates, the primary function of the air gate supports is to provide a proper distribution of the pressurized air to the orifices in the film air gates. As previously mentioned, air is supplied to arrangements 33a and 33b by means of hoses 32a–32d, hoses 32a and 32b intercoupling manifold 31 with air gate support member 35a and hoses 32c and 32d likewise intercoupling manifold 31 with air gate support member 35b.

Film air gates 34a and 34b are shown in detail in FIGS. 2(a)–2(e) to which reference is now made. The faces of the film air gates, that is to say, the sides of the air gates that face each other, are shown in FIGS. 2(a) and 2(b) and from these views it will be recognized that the two air gates are substantially identical in construction and appearance. As shown, the air gates are rectangular-shaped and, insofar as these air gates are adapted for use with film, they each also include several windows or openings, the windows in air gate 34a being designated 40a, 41a and 42a while the windows in air gate 34b being correspondingly designated 40b, 41b and 42b. As may be expected, the windows in one air gate are respectively in alignment with or in registration with their counter part windows in the other air gate when the two air gates are in face-to-face relationship in the manner shown in FIG. 1. Windows 40 may be used for scanning the code recorded on the film while windows 41 and 42 may respectively be used either to project a recorded document onto a screen for viewing or to project it for photocopying purposes. It should be emphasized at this point, however, that windows 40, 41 and 42 are not material features of the invention and are included only because the embodiment being described has been particularly adapted for use in connection with the processing of information recorded on film.

The face areas surrounding each of the windows in the air gates are raised, the orifices through which the pressurized air are blown being located and distributed within the borders of these raised areas. Thus, the raised portions surrounding windows 40a and 40b are respectively designated 43a and 43b, the raised portions surrounding windows 41a and 41b are respectively designated 44a, 44b and 45a, and the raised portions around windows 42a and 42b are respectively designated 46a, 46b and 47a, 47b. Within the boundaries of raised surface area 43a is a set or group of orifices 50a that extend through air gate 34a to the other side and, similarly, within the borders of raised surface area 43b is located another group or set of orifices 50b that extend through and to the other side of air gate 34b. Orifices 50a and 50b are arranged in identical patterns so that they are respectively in alignment or in registration with each other when the two air gates are in face-to-face relationship. As shown in FIGS. 2(a) and 2(b), orifices 50a and 50b are arranged in a rectangular pattern of rows and columns but it will be recognized that these orifices may be arranged in other patterns as well. Thus, for example, in raised portions 44, 45, 46 and 47, the orifices are arranged to form only a single column.

Finally, a plurality of grooves are cut out of raised surface areas 43a and 43b between the columns of orifices thereon, one such groove between each pair of columns of orifices. These grooves provide escape routes for the relatively large amount of air coming out of the many orifices in raised portions 43a and 43b, the grooves in raised portion 43a being designated 51a, 52a and 53a and the grooves in raised portion 43b being similarly designated 51b, 52b and 53b. As may be expected, the grooves in air gate 34a are in complete alignment or registration with the grooves in air gate 34b when the two air gates are in face-to-face relationship.

An end view of air gate 34a is shown in FIG. 2(c) whereas a front view of air gate 34b is shown in FIG. 2(d), the raised surface areas, the grooves, the windows and orifices being clearly shown in the latter view. It will also be seen from the front view in FIG. 2(d) that the very ends of the air gates are tapered so that when the air gates are placed in face-to-face relationship, their ends gradually open outwardly so that the air flowing in that direction expands only gradually as it leaves the air gates, thereby preventing turbulence that might otherwise hamper the smooth movement of the film. The tapered ends of air gate 34b in FIG. 2(d) are respectively designated 54b and 55b. A cross-sectional view of raised surface area 44b of air gate 34b, for the purpose of showing the structure of an orifice 50, is presented in FIG. 2(e), the view being taken in the direction of arrows 2E—2E in FIG. 2(b). As shown, each orifice is considerably larger in diameter at its back end than it is at its front end whereat the air under pressure emerges for projection against the film, a tapered section intercoupling the front and back portions of the orifice.

Air gates 34a and 34b, when placed in face-to-face relationship, are physically or mechanically supported in those positions by means of air gate support members which also supply the air under pressure to the air gates for distribution to the different orifices. Like the air gates, the air gate support members are identical. Accordingly, only one such member is illustrated in FIGS.

3(a)–3(c) to avoid being redundant as well as for sake of expediency. The front face of the air gate support member, that is, the face that is brought into intimate contact with the back side of an air gate, is shown in FIG. 3(a) to include a rectangular-shaped recess 56 into which an air gate snugly fits for air-tight coupling between the two. An air gate in outline form is shown fitted into recess 56 in FIG. 3(b). To accommodate the particular adaptation of air gates 34a and 34b of FIGS. 2(a) and 2(b), respectively, the air gate support member further includes a plurality of windows 57, 58 and 59 that are not only identical in shape to windows 40, 41 and 42 in the air gates but also in registration with them when the air gates are mounted on the support members. A cross-sectional view through window 59 taken in the directions of arrows 3C—3C in FIG. 3(a) is presented in FIG. 3(c).

Each air gate support member also includes a pair of cavities 60 and 61 whose configurations are such that they fit over or, stated differently, are superimposed upon the patterns of orifices in the associated air gate in an airtight manner so that an air-tight chamber is formed, with the result that pressurized air entering these cavities will necessarily flow into the orifices covered thereby. Thus, for sake of example, if air gate 34a in FIG. 2(a) were to be mounted in recess 56 of the air gate support member shown in FIG. 3(a), then cavity 60 would overlie orifices 50a in raised surface areas 43a and 44a while cavity 61 would overlie orifices 50a in raised surface areas 45a, 46a and 47a. In the particular embodiment being described, cavity 61 is actually made-up of two smaller cavities 61a and 61b that are linked together by means of a groove 61c, cavity section 61a overlying orifices 50a in raised surface areas 45a and 46a and cavity section 61b overlying orifices 50a in raised surface area 47a.

Air is respectively fed to cavities 60 and 61 by means of a pair of passageways or channels designated 62 and 63 that extend through the air gate support member and couple to the hoses leading from manifold 31, as shown in FIG. 1. The ends of air channels 62 and 63 that open into cavities 60 and 61 are respectively designated 62a and 63a whereas the ends of the air channels that open to the outside of the support member and that couple to the manifold are rsepectively designated 62b and 63b. Although intimated previously, it should be specifically mentioned that two of the four hoses 32 leading from manifold 31 are connected in an air-tight manner to the support member at openings 62b and 63b, with the result that air forced through the hoses are also forced through air channels 62 and 63 and into cavities 60 and 61 wherein the air spreads out or distributes itself for passage through all the orifices 50.

A very greatly enlarged cross-sectional view is shown in FIG. 4 of the region around an orifice 50 when the air gates are in face-to-face relationship with the film moving midway therebetween. The region presented is in the vicinity of raised surface portions 47a and 47b since the tapered ends 55a and 55b are clearly shown. Also clearly shown by means of the arrows is the flow of the air as it comes through opposing orifices 50a and 50b. As can be seen, the air on each side of film 36 divides into two parts as it abuts against it, one part moving along with the film to emerge from between tapered ends 55a and 55b and the other part moving in a direction opposite to that of the film for venting or escape to the outside somewhere else in the arrangement.

The physical and operative features of an embodiment of the invention having been described in detail, it would be worthwhile at this time to present dimensions or values that may be adopted for some of these features. Thus, in one arrangement of the embodiment described, with the film 0.0055 inch thick, the spacing between air gates 34a and 34b may range from a minimum of 0.0095 inches to a maximum of 0.0125 inch; the diameter of air nozzles or orifices 50 opening onto the film should be 0.008 inch; and the pressure of the air blown through the orifices may range from a minimum of 30 p.s.i. to a maximum of 40 p.s.i. if satisfactory operation is to be realized. Again grooves 51, 52 and 53 are 0.062 inch wide and 0.05 inch deep; and ends 54 and 55 are tapered at an angle of 11 degrees from the horizontal.

Although a particular embodiment of the invention has been illustrated and described, it is not intended, as has already been mentioned, that the invention be limited thereto. Accordingly, the invention should be considered to include any and all modifications, alternations or equivalent arrangements falling within the scope of the annexed claims.

Having thus described the invention, what is claimed is:

1. In film transport apparatus, a mechanical arrangement for supporting the moving film by means of air under pressure, said arrangement comprising: a pair of rectangular-shaped plates in face-to-face relationship with the film moving therebetween and respectively including windows that are in registration with each other and through which the film may be projected, said plates respectively including equal numbers of orifices through which air is blown against the sides of the film and being tapered outwardly at their narrow ends to provide a smooth transition for air emerging from between them, said orifices being arranged in columns and rows that extend across the length and breadth of said plates; and a pair of plate support members respectively having cavities on the surfaces thereof and air passages through which air under pressure is fed to said cavities, said pair of plates respectively being mounted on said support members with the cavities thereof air-tightly cupped over said orifices, said support members respectively including windows that are in registration with each other and with the windows of said plates.

2. The mechanical arrangement defined in claim 1 wherein the surface areas on said plates that encompass said patterns of orifices within their boundaries are entirely raised with the orifices therein arranged to substantially form rows and columns.

3. Transport apparatus using air under pressure to support a solid ribbon-type medium moving through it, said apparatus comprising: first and second rectangular-shaped plate-like members in face-to-face relationship with the ribbon-type medium moving therebetween, said members respectively including several patterns of pinhole type orifices therethrough that are respectively in registration with each other and through which air under equal pressure is forced, the orifices throughout the several patterns of each plate-like member being arranged to form columns and rows that extend across the length and breadth of said member, said orifices being shaped and oriented to direct the air in a normal direction against the full surface areas of the medium for support thereof; a manifold mechanism for dividing the air supplied to it under pressure into two substantially equal portions and at substantially equal pressures; and third and fourth members coupled between said first and second members, respectively, and said manifold mechanism for supplying said two portions of air at substantially the same pressure to all the orifices in said first and second members, said third and fourth members respectively including cavities that are air-tightly cupped over said patterns of orifices, and air passages respectively linking said cavities with said manifold.

4. Transport apparatus using air under pressure to support a solid, ribbon-type medium moving through it, said apparatus comprising: first and second plate-like members in face-to-face relationship with the ribbon-type medium moving therebetween, said members including identical patterns of pin-hole type orifices therethrough that are respectively in registration with each other and through which air under equal pressure is forced, said orifices being shaped and oriented to direct the air in a normal direction against the sides of the medium for support thereof, said first and second plate-like members being rectangular-shaped to support a length of the medium and being tapered outwardly at the ends thereof to provide a smooth transitional flow for the air emerging from between these ends, said members including grooves in the faces thereof to provide escape routes for the large amount of air coming out of said orifices; a manifold mechanism for dividing the air supplied to it under pressure into two substantially equal portions and at substantially equal pressures; and third and fourth members coupled between said first and second members, respectively, and said manifold mechanism for supplying said two portions of air at substantially the same pressure to all the orifices in said first and second members.

5. Transport apparatus using air under pressure to support a solid, ribbon-type medium moving through it, said apparatus comprising: first and second plate-like members in face-to-face relationship with the ribbon-type medium moving therebetween, said members including identical patterns of pin-hole type orifices therethrough that are respectively in registration with each other and through which air under equal pressure is forced, said orifices being shaped and oriented to direct the air in a normal direction against the sides of the medium for support thereof, said first and second plate-like members being rectangular-shaped to support a length of the medium and being tapered outwardly at the ends thereof to provide a smooth transitional flow for the air emerging from between these ends, said members including grooves in the faces thereof to provide escape routes for the large amount of air coming out of said orifices; a manifold mechanism for dividing the air supplied to it under pressure into two substantially equal portions and at substantially equal pressures; and third and fourth members coupled between said first and second members, respectively, and said manifold mechanism for supplying said two portions of air at substantially the same pressure to all the orifices in said first and second members, said third and fourth members including cavities that are respectively cupped in an air-tight manner over said patterns of orifices, and air passages respectively linking said cavities with said manifold.

6. Apparatus using air under pressure to support a photographic film moving through it, said apparatus comprising: first and second plate-like members in face-to-face relationship and spaced from each other from between 0.0095 to 0.0125 inch with the film moving therebetween, said members respectively including identical patterns of orifices therethrough that are respectively in registration with each other and through which air under pressure is forced, said orifices being shaped and oriented to direct the air in a normal detection against the sides of the film for support thereof, the diameter of the orifice nozzles being about 0.008 inch and the pressures of air blown through the orifices ranging from 30 p.s.i. to 40 p.s.i., said members including grooves in the faces thereof to provide escape routes for the large amount of air coming out of said orifices, said grooves being about 0.062 inch wide and about 0.05 inch deep; and means coupled in an air-tight manner to said first and second members for supplying substantially equal amounts of air under said pressure to said orifices.

References Cited by the Examiner

UNITED STATES PATENTS

| 2,060,430 | 11/36 | Spooner. | |
| 2,605,555 | 8/52 | Griggs et al. | 34—82 |
| 2,848,820 | 8/58 | Wallin | 226—97 X |
| 3,081,554 | 3/63 | Long | 34—44 |
| 3,097,779 | 7/63 | Rock | 226—7 |
| 3,103,850 | 9/63 | Khoury | 226—7 X |

OTHER REFERENCES

IBM Technical Disclosure Bulletin, "Air Flow Distribution Plenums," vol. 5, No. 6, page 28, November 1962.

ROBERT B. REEVES, *Primary Examiner.*

RAPHAEL M. LUPO, *Examiner.*